Aug. 3, 1948.  E. W. KELLEY  2,446,287
VERNIER FOR MECHANICALLY MEASURING ANGLES
Filed March 5, 1945  3 Sheets-Sheet 1

INVENTOR.
ELMER W. KELLEY
BY
Martin E. Anderson
ATTORNEY

Aug. 3, 1948.  E. W. KELLEY  2,446,287
VERNIER FOR MECHANICALLY MEASURING ANGLES
Filed March 5, 1945  3 Sheets-Sheet 2

INVENTOR.
ELMER W. KELLEY
BY Martin E. Anderson
ATTORNEY

Aug. 3, 1948.  E. W. KELLEY  2,446,287
VERNIER FOR MECHANICALLY MEASURING ANGLES
Filed March 5, 1945  3 Sheets—Sheet 3

INVENTOR.
ELMER W. KELLEY
BY
Martin E. Anderson
ATTORNEY

Patented Aug. 3, 1948

2,446,287

UNITED STATES PATENT OFFICE 2,446,287

VERNIER FOR MECHANICALLY MEASURING ANGLES

Elmer W. Kelley, Denver, Colo.

Application March 5, 1945, Serial No. 580,982

3 Claims. (Cl. 116—124)

This invention relates to improvements in protractors and has reference more particularly to a protractor designed for use with machines such as planers and boring mills to determine the exact relationships of certain parts thereof.

In manufacturing, it often happens that certain surfaces must be planed at a prescribed angle, or holes bored at precise angles and in order to accomplish this the machinist has to set the different parts of the machine so as to obtain the desired results.

At present some machines, such as planers, shapers and boring mills, are provided with graduated circles by means of which the angular relationship of the parts can be roughly determined. Even where verniers are associated with the graduated scales, it is difficult to determine the angle exactly; in most cases this requires calculation and very careful manipulation and setting of the parts.

It is the object of this invention to produce a protractor that can be applied directly to a machine and which will automatically measure and indicate the exact angle through which the particular machine part is moved. By this means the machine can be set at exactly the right angular relationship without the necessity of calculation and the careful inspection of verniers which must now be resorted to.

This invention, briefly described, consists of a pivot secured to the axle about which the part to be adjusted turns and is held stationary with respect to the axle. A vernier disk is nonrotatably secured to the outer end of the pivot. A vernier arm provided with a hub is mounted for rotation on the pivot and is attached to the part to be adjusted. This arm is interconnected by means of a train of gears with the stationary vernier disk. A second vernier disk is mounted for rotation about the hub of the disk arm 30 and is operatively connected with the other parts by means of a gear train in such a way that it will automatically indicate the angle through which the machine element has been moved.

Having thus, in a general way, described the objects of the invention and broadly described the construction thereof, the invention will now be described in detail, and for this purpose reference will be had to the accompanying drawings in which the invention has been illustrated in its preferred form, and in which.

Figure 1:
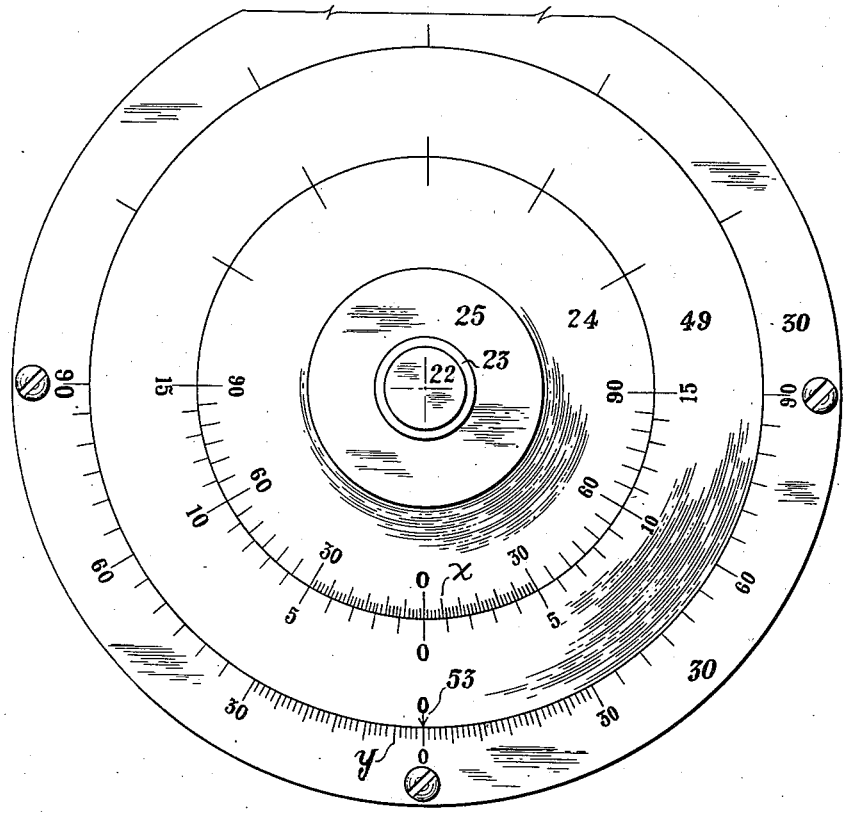
Figure 1 is a top plan view of the vernier.

In the drawing reference numeral 10 designates the base of a planer, reference numeral 11 represents the planer bed, and 12 designates a tool post or pivot arm. The planer bed is rotatable about a fixed axle 13 and the tool post or arm about fixed axle 14. Secured to the planer bed and to the pivot arm or tool post are vernier 15, constructed in the manner which will now be described.

Figure 4:
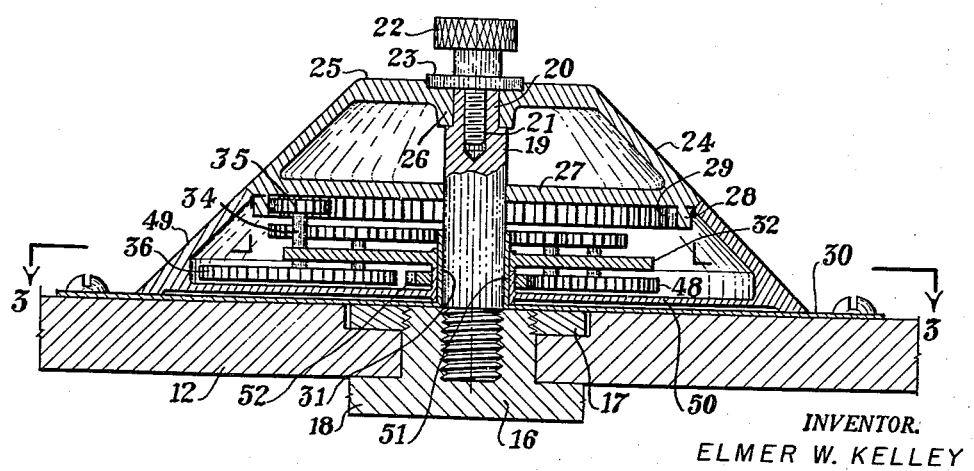
Figure 4 is a diametrical section taken on line 4—4, Figure 3.
Figure 5:
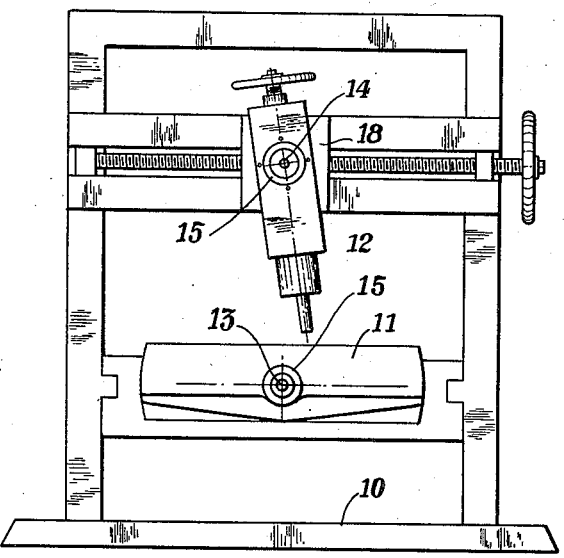
Figure 5 is a front elevation of a planer showing how the vernier is secured thereto.

Referring now more particularly to Figure 4, where the parts have been shown in section, reference numeral 16 designates a stationary axle which corresponds to the axles 13 and 14 in Figure 5. Mounted for rotation about axle 16 is a tool post or arm 12, or any other machine element, such as the planer table 11. A nut 17 has been shown as threadedly connected with the stationary axle and holds arm 12 in place. Hereinafter the device will be described in relation to the tool post or arm 12, it being understood that any other pivoted member can be substituted. Axle 16 forms a part of, or is nonrotatably secured to a plate 18. The present embodiment shows an axle 19 threadedly connected with the stationary axle 16 in axial alignment therewith. Pivot 19 is held against rotation by suitable means which, in the present embodiment, will be considered as the frictional resistance between the adjacent surfaces of axles 16 and pivot 19. The outer end of pivot 19 is provided with a section 20 of reduced diameter and with a threaded central opening 21. Cooperating with the central opening is a screw having a head 22 and a flange 23. The particular shape of the head and flange have, in the present instance, been determined by ornamental considerations and any other suitable shape may, of course, be substituted. Positioned on pivot 19 is a disk 24 which has a frustoconical surface. The upper surface 25 is flat and circular and a tubular hub 26 extends inwardly and receives the reduced portion 20 of the pivot. Suitable means is provided to prevent accidental rotation between the pivot 19 and disk 24. The lower side of the disk 24 has a transverse member 27 that is provided with an opening for the reception of the pivot 19. Member 27 may be flat and continuous as shown in the drawing, or may be provided with spokes as a wheel, if desired. Extending downwardly from the under surface of member 27 is a ring gear 28 provided with gear teeth 29 on its inner surface. It may be stated at this point that, although ring gear 28 has been shown as an internal gear, it may be replaced by an external gear, if desired.

Figure 3:
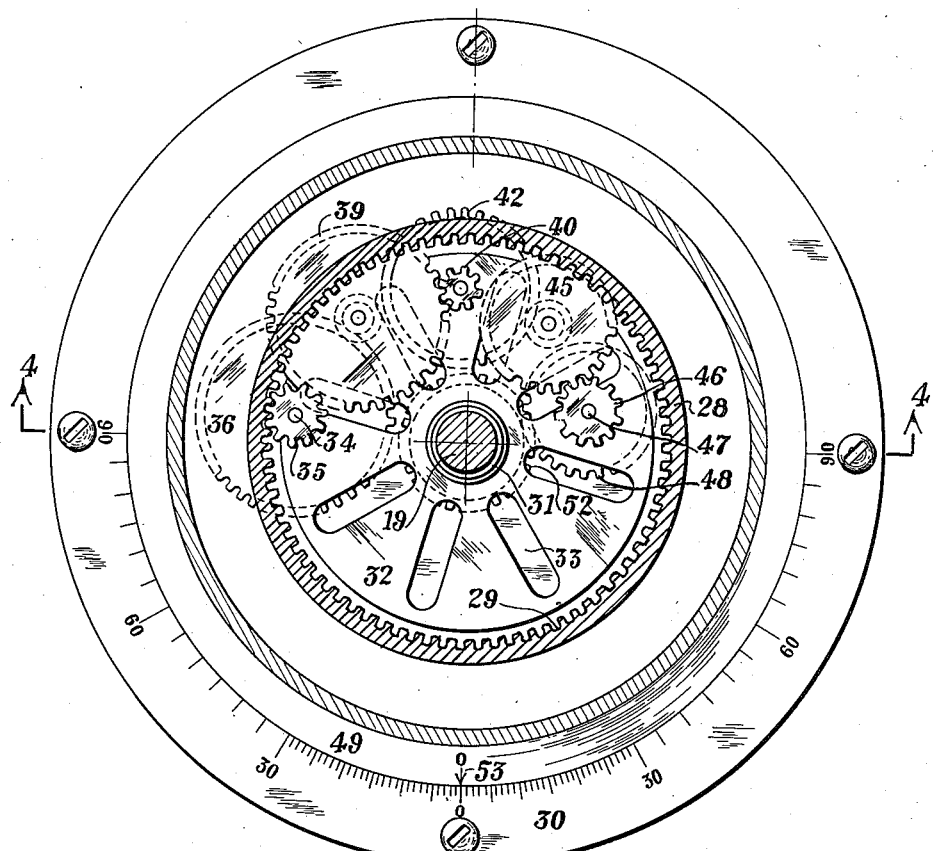
Figure 3 is a horizontal section taken on line 3—3, Figure 4.

Graduated disk 30 is provided with a hub 31 positioned centrally thereof and extending from one side as shown in Figure 4. This hub is of the proper diameter to receive the pivot 19. Secured to the hub is a plate or arm 32 that has been shown as circular, Figure 3, and provided with openings 33 to reduce the amount of material. Arm 32 serves as a bearing member for a number of gear sections, each comprising a shaft having a gear at each end as shown most clearly in Figures 6 and 7 to which reference will now be made.

Figure 6:
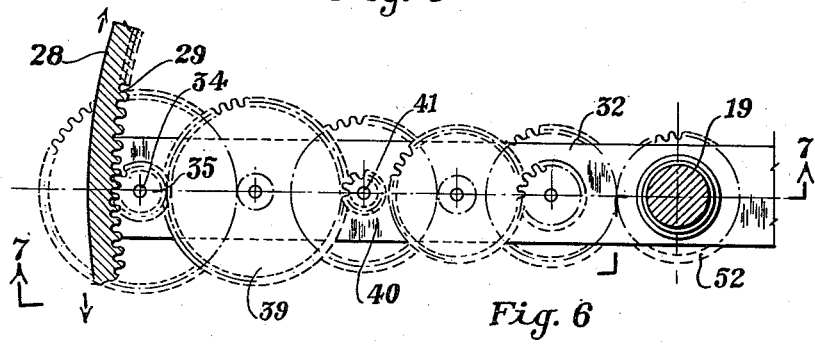
Figure 6 is a top plan view of a gear train showing the same to an enlarged scale and in a straight line relation.
Figure 7:
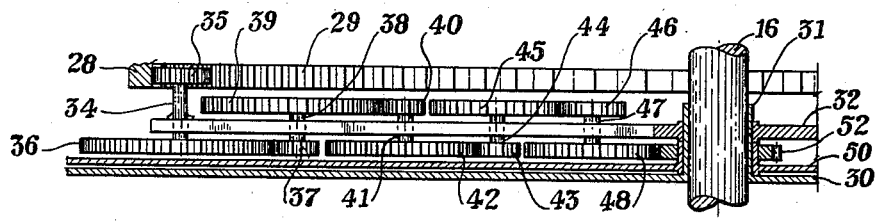
Figure 7 is a side elevation and partial section taken on line 7—7, Figure 6.

Arm 32 has been shown as straight in Figures 6 and 7 so as to facilitate description and make the arrangement clearly apparent. Secured to the outer end of arm 32 is a shaft 34 and this carries a pinion 35 at its upper end. Pinion 35 is in mesh with the ring gear 28. A gear 36 is secured to the inner end of the shaft 35 and this meshes with the pinion 37 on shaft 38 to the upper end of which a gear 39 is secured. Gear 39 meshes with a pinion 40 on shaft 41 and secured to the lower end of this shaft is a gear 42 that meshes with pinion 43 on shaft 44. Secured to the upper end of shaft 44 is a gear 45 that meshes with pinion 46 on shaft 47 and secured to the shaft 47 is a gear wheel 48. The train of gears may comprise as many sets of gears as may be necessary and the gear ratios may be selected so as to get the best arrangement for the particular purpose. Mounted for rotation on hub 31 of the graduated disk 30 is a vernier disk which has been designated by reference numeral 49. This disk has a base plate 50 that is provided with a hub 51 having a bearing of the proper size to receive hub 31. Secured to the upper end of hub 51 is a ring gear 52 that meshes with gear 48 as shown most clearly in Figures 6 and 7. The ratio of the gear train for the present apparatus has been so calculated that whenever the graduated arm 30 and arm 12 rotate one degree about the axis of the pivot, disk 49 will rotate 361 degrees, preferably in the direction in which the arm is moved.

Although the several gears of the gear train have been shown to such relative sizes as to obtain the gear ratio desired, it is to be understood that the specific sizes and arrangements are merely illustrative. It will be observed from Figure 3 that the different shafts are arranged around the center of the pivot instead of in a straight line as shown in Figures 6 and 7.

From the above description, taken in connection with the drawing, it will be seen that whenever the arm 12, with its attached disk 30 is rotated relative to pivot 19, it will also rotate relative to disk 24 and to the internal gear 28. Since bearing arm 32 is nonrotatably connected with graduated disk 30, it follows that the gear train will be set in motion whenever disk 30 is rotated and this, in turn, will produce a rotation of the protractor disk 49, the latter moving 361 degrees to every degree that the arm 12 is moved.

Figure 2:
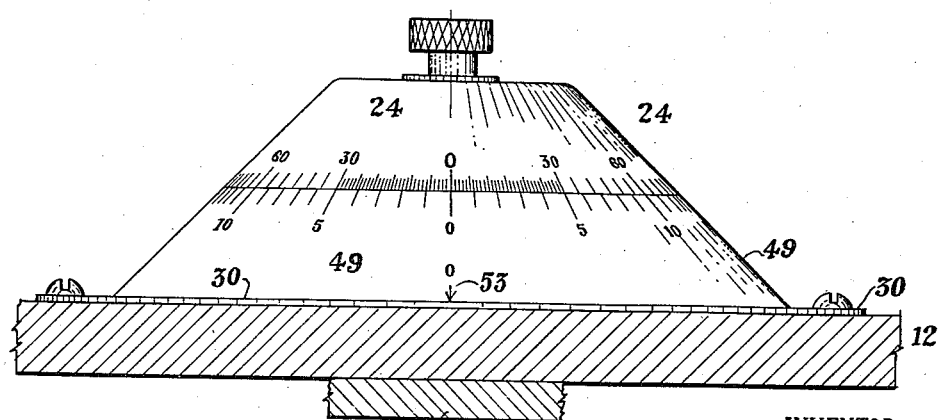
Figure 2 is a side elevation thereof showing it attached to the movable arm of a machine.

Referring now to Figures 1 and 2, it will be observed that the stationary protractor disk, which has been designated by reference numeral 24, is graduated in degrees in both directions from zero and that the rotatable disk 49 is graduated in minutes in both directions from zero. Graduated disk 30, which is connected with the arm 12, is graduated in degrees in both directions from the zero point.

Let us now assume that the parts occupy the position shown in Figure 1 and that arms 12 and 30 are turned five degrees in a counterclockwise direction. Due to the gear ratio employed, the zero on disk 49 will now coincide with the five degree line on disk 24, which point has been designated by "X." In order to reach this position, disk 49 has turned five complete revolutions, plus five degrees and the zero point on disk 49 will therefore be in line with the graduation "X." If the arm is moved through an angle of exactly five degrees, the three zero points will be on a radius extending through the five degree line "X" on disk 24. Let us now assume that arm 30 is moved an additional five minutes. Since disk 48 makes a complete revolution for each degree that arm 30 moves, it will have to turn one-twelfth of a revolution more or thirty angular degrees more when arm 30 moves an additional five minutes; this will bring the upper scale zero on disk 49 in line with graduation 35 on disk 24. If the arm is adjusted in the opposite direction, the readings will be the same, although on the opposite side of the zero line.

From the above description, it will be evident that if an operator desires to adjust the tool post or the planer bed to any prescribed angle, he changes the angular adjustment slowly to the point designating the degrees and then makes further adjustment to bring the proper minute graduation in alignment with the degree graduation and then completes the setting by adjusting arms 12 and 30 so as to bring the proper second graduation in the line with the zero line 53 of disk 49.

In the drawing the pivot 19 has been shown as formed from a separate piece and secured to axle 16, but it is evident that if this device is applied at the factory, axle 16 and pivot 19 may be made from a single piece.

The exact shape of the vernier disks can be varied to suit the taste or convenience of the designer. The present frustoconical disks have been selected because they are believed to be the simplest and give the most ornamental appearance to the completed article.

Since disk 30 is secured to the arm or other part to be adjusted, the two move as a unit and disk 30 has therefore been referred to by the term "arm" as well as disk arm.

Although this device is intended primarily for use with machines, it is evident that the disk 30 can be provided with a radially extending straight edge and that the part 18 can be secured to a drafting table or other place where angles are required to be carefully measured. This device is also useful in connection with navigation or with astronomy where exact angles are to be found and determined and it simplifies the process of measuring angles accurately.

Having described the invention what is claimed as new is:

1. A vernier comprising, a nonrotatable protractor pivot operatively connected with a stationary base, a stationary vernier disk nonrotatably secured to the end of the pivot, the under surface of said disk having a gear concentric with the pivot, a vernier arm provided on one side with a tubular hub, rotatably mounted on the pivot, a gear train arm nonrotatably secured to the hub adjacent its upper end, a train of gears carried by the gear train arm, comprising a plurality of cooperating gear sets, each set having a shaft rotatable in bearings in the gear train arm and a gear at each end of the shaft, the shaft at the outer end of the gear train arm having a pinion in operative engagement with the gear on the stationary vernier disk, a second vernier disk having a tubular hub mounted for rotation on the first mentioned hub, a ring gear mounted on the last named tubular hub, the last gear in the gear train being operatively connected with the ring gear, whereby when the vernier arm and gear train arm are rotated about the pivot, the second mentioned vernier disk will be rotated relative to the stationary vernier disk, the last mentioned vernier disk being graduated in degrees, the rotatable vernier disk having a scale graduated in minutes, positioned adjacent the scale on the stationary vernier arm and a zero line adjacent the vernier arm, the latter having a graduated scale concentric with the pivot and in operative relation to the zero line on the rotatable vernier disk.

2. A vernier for use with a device having a stationary axle and an arm mounted for oscillation thereon, comprising a vernier pivot in axial alignment with the axle and nonrotatable relative thereto, a stationary vernier disk nonrotatably connected with the vernier near its outer end, the under surface of said disk having a ring gear concentric with the pivot, a vernier arm having one side provided with a tubular hub, rotatably mounted on the pivot, a gear train arm nonrotatably connected with the outer end of the hub, a train of gears carried by the gear train arm, comprising a plurality of cooperating gear sets, each set having a shaft rotatable in bearings in the arm and a gear at each end of the shaft, the shaft at the outer gear train end of the gear train arm having a pinion in engagement with the ring gear on the stationary vernier disk, a second vernier disk having a tubular hub mounted for rotation on the first mentioned hub, a ring gear mounted on the last named vernier arm hub, the last gear in the train being operatively connected with the ring gear, whereby when the vernier arm is rotated with respect to the stationary protractor disk the second vernier disk will rotate relative to both, the gear train being so proportioned that the rotatable vernier disk will turn three hundred and sixty-one degrees for each degree rotation of the vernier arm disk.

3. In a machine having a stationary axle and an arm mounted on the axle for angular adjustment, means for measuring and indicating the value of the angular adjustment comprising a pivot rigidly associated with the stationary axle, in axial alignment therewith, a vernier arm having a tubular hub projecting from one side, mounted on the pivot and means for nonrotatably securing the vernier arm to the first arm, a vernier disk having a tubular hub on one side, rotatably mounted on the hub of the vernier arm, a ring gear secured to the protractor disk hub, a gear train arm nonrotatably secured to the hub of the vernier arm, a train of gears carried by the gear train arm, comprising a plurality of cooperating gear sets, each set having a shaft rotatable in bearings in the gear train arm, and a gear at each end of the shaft, the several sets being operatively interconnected, the last gear at the inner end of the train being in operative engagement with the ring gear, the last gear at the outer end of the train being a pinion, a vernier disk nonrotatably secured to the outer end of the pivot, and a ring gear on the under surface of the last named disk in operative engagement with the pinion, the two relatively rotatable vernier disks having cooperating graduated scales, the rotatable disk having a zero line at its inner edge and the operator disk having a graduated scale operatively related to the zero line.

ELMER W. KELLEY.

REFERENCES CITED

The following references are of record in the file of this patent:

UNITED STATES PATENTS

| Number | Name | Date |
|---|---|---|
| 1,060,466 | Leloup | Apr. 29, 1913 |
| 1,760,938 | Edgar | June 3, 1930 |
| 2,000,926 | Cox | May 14, 1935 |
| 2,070,675 | Niemeyer | Feb. 16, 1937 |
| 2,273,956 | Hall | Feb. 24, 1942 |
| 2,401,029 | Thompson | Apr. 22, 1946 |